Aug. 16, 1949.　　　　B. A. BUSS　　　2,479,153
REVERSING AND STOP CONTROL FOR ELECTRIC MOTORS
Filed April 27, 1944
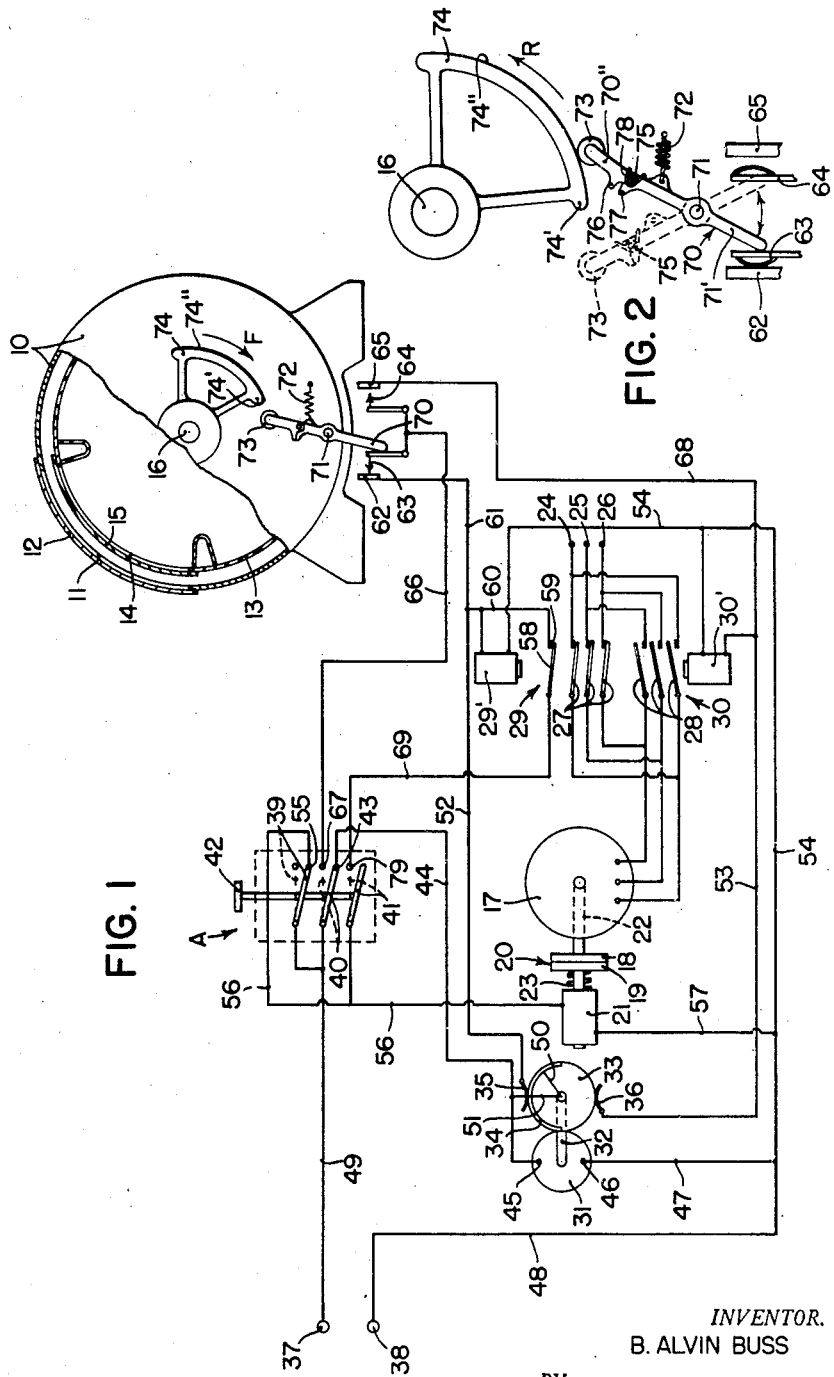
INVENTOR.
B. ALVIN BUSS
BY
ATTORNEY Patented Aug. 16, 1949

2,479,153

UNITED STATES PATENT OFFICE 2,479,153

REVERSING AND STOP CONTROL FOR ELECTRIC MOTORS

Benjamin Alvin Buss, East Moline, Ill., assignor to American Machine & Metals, Inc., Moline, Ill., a corporation of Delaware Application April 27, 1944, Serial No. 532,935

22 Claims. (Cl. 318—265)

This invention relates to means for automatically positioning and stopping various motor-driven elements, and is here illustrated as embodied in means for stopping a motor-driven cylinder in or close to a definite position with respect to a stationary shell surrounding the cylinder.

In certain types of machines, such as commercial washing machines, a cylinder rotatable within a stationary shell is used having an opening for the introduction and removal of the load, e. g., clothes to be washed. A similar opening is provided in the stationary shell and both openings are kept closed by doors during normal operation of the machine. As it is necessary to have the doors in register for unloading or loading the cylinder when the machine is at rest, devices have been designed for the purpose of stopping the machine at a moment when the doors are approximately in register.

As the cylinder is only partly filled by its load and generally has ribs, it is desirable to have the cylinder come to a stop immediately following its turning movement in that direction which brings the load to the front of the machine where it can be easily reached for unloading.

It is an object of the invention to provide improved control means for stopping a motor-driven element which is adapted to work under varying load conditions, such as the rotating cylinder of a washing machine, within a particular and limited angular range.

A further object of the invention is to provide means for stopping a power-driven element within a particular and limited angular range by cutting off the power as the element turns into this range, and applying reversing power if and as often as the element should pass beyond the limits of said particular and angular range.

A further object of the invention is to provide means for stopping a power-driven element within a particular and limited angular range by cutting off the power as the element turns into this range, applying a brake while the element, impelled by inertia, traverses the range, and applying reversing power if and as often as the element should pass beyond the limits of said angular range.

A further object of the invention is to provide means for stopping a motor-driven, reversibly rotatable element within a particular and limited angular range which will cause the element to oscillate back and forth through said range and a relatively small distance therebeyond, and which causes the movements outside of said range in one direction to be subject to the drag or action of a brake applied to the motor and in the opposite direction to be free from any braking action.

Another object of the invention resides in the provision of a compact unitary assembly of devices for automatically controlling the application of power to the motor in either direction of rotation and the release of the brake, with only a single manually operable member for starting and stopping the operation of the devices constituting the assembly.

A further object of the invention is to provide, in combination with a device for stopping a reversible motor-driven cylinder, two circuits, each of which has a switch which is so constructed that it tends to maintain itself in open position, and in which the switches are spaced apart a distance equal to a relatively small fraction of a full revolution of the cylinder and are alternatively closable by a single switch-closing member which moves to close one or the other.

Another object of the invention is to provide, in combination with a device for stopping a reversible motor-driven cylinder, a brake-releasing circuit containing a switch which is operable by and which preferably forms a structural unit with one of the reversing means, e. g. reversing relays.

Still another object of the invention is to provide, in combination with a device for stopping a cylinder driven by a reversible motor whose power supply is controlled by electromagnetic reversing relays, a brake-releasing circuit containing two switches in series, one of which forms a part of the armature of one of the reversing relays and the other of which is mechanically interlocked with a stop switch.

Another object of the invention is to provide an actuating element for a switch-closing member which will engage said member when the cylinder enters the permissible stopping range when rotating in a particular direction, and push said member to the other end of the permissible range, holding it there for a definite proportion of a revolution of a cylinder beyond the stopping range.

Further objects of the invention will appear as the description proceeds, reference being had to the accompanying drawing, in which—

Fig. 1 shows in a diagrammatic manner and by way of example one embodiment of the invention as applied to a washing machine; and Fig. 2 is a front elevation, on a larger scale, of the switch-closing member and the actuating mechanism therefor, the switch-closing member being shown in two positions.

The reference numeral 10 indicates a stationary shell of a washing machine having an opening 11 closed by a door 12. Rotatably mounted in said shell is a cylinder 13 provided with an opening 14 and a door 15. The cylinder 13 is driven by a shaft 16 from a reversible electric motor 17. Associated with the motor 17 is a brake 20, of any suitable construction, adapted to be released by means of a solenoid 21 when the latter is energized. The brake creates a drag which tends to stop the cylinder 13 but which is not sufficiently powerful to overcome the starting torque of the motor. In the example shown, the brake 20 is indicated as being a friction brake and as comprising two discs 18 and 19, the disc 18 being secured to the shaft 22 of the motor 17 and the disc 19 being slidably mounted on said shaft 22. A spring 23 urges the disc 19 against the disc 18 when the solenoid 21 is not energized.

The reversible motor 17, shown in the drawing as a three-phase motor, is connected to a current source, 24, 25 and 26, under the control of either of the two switches 27 and 28, the switch 27 being part of the armature of a relay 29 and the switch 28 forming the armature of a second relay 30. The switches 27 and 28 provide for a current supply to the motor 17 in opposite phases, and while these switches are represented in the drawing as 3-pole switches they could be used in the form of 2-pole switches, even if the motor is a three-phase motor like the one shown in the example.

A timing motor 31 rotates a shaft 32 upon which a disc 33 carrying a contact segment 34 is fixed. The contact segment 34 extends over about half the circumference, preferably a little less than half the circumference, of the disc 33, and cooperating with the disc 33 are two contact brushes 35 and 36. The timing motor 31 receives its current from a supply line 37, 38, which is shown in the diagram of Fig. 1 as a separate current source but which could be branched off from the supply lines 24, 25, 26. The supply terminal 37 is connected through a lead 49 to two movable contacts 39, 40 of a 3-pole master switch A. The movable contact 40 together with the fixed contacts with which it cooperates will be referred to hereinafter as the "stop switch," for reasons which will appear as the description proceeds. The master switch A is manually operable as a whole by means of a handle 42.

With the master switch A in the position shown in full lines, which is the position for normal operation of the machine, a circuit for the timing motor 31 is established leading from the supply terminal 37 over the lead 49 and the movable stop switch contact 40 to a fixed contact 43 of this stop switch, and from there over a lead 44 to one terminal 45 of the timing motor 31, whose other terminal 46 is connected by leads 47, 48 to the supply terminal 38. The contact segment 34 has a connection 50 to the shaft 32, which in turn is connected by means of a lead 51 to the lead 44. The brush 35 is connected by a lead 52 to the coil 29' of the relay 29 and the brush 36 by a lead 53 to the coil 30' of the relay 30. A common return lead 54, connected by means of the lead 48 to the supply terminal 38, is provided for both relay coils 29', 30'. The movable contact 39 of the master switch A makes contact with a fixed contact 55 connected by a lead 56 with one terminal of the brake releasing solenoid 21, whose other terminal has a connection 57 to the supply terminal 38 via the lead 48. It will be seen that the timing motor 31 will continuously rotate during the time the switch A is in the running position and will bring the contact segment 34 intermittently in contact with the two contact brushes 35, 36. Thus the coils 29' and 30' of the relays 29 and 30 are intermittently energized, and when energized will operate their respective armatures 27 and 28 and thereby cause alternating rotation in "forward" and "reverse" direction of the motor 17 as well as of the cylinder 15 of the washing machine. The "forward" relay 29 will cause rotation of the cylinder 15 in the direction indicated in Figure 1 by the arrow F and the "reverse" relay 30 will cause rotation in the opposite direction. The switches 27 and 28 of the relays 29 and 30, respectively, are biased to open position, so that when both of the relays 29 and 30 are deenergized, the motor 17 is disconnected from the current source 24, 25, 26.

The master switch A has a third movable contact 41, which forms a part of a circuit which includes a switch 58, which in the example shown forms a part of the forward relay 29 so that the switch 58 is closed at the same time the switch 27 is closed when the latter is operated by the coil 29'. The switch 58 (which, like the switches 27, 27, 27, is biased to open position) is connected by a lead 69 to a fixed contact 79, which forms a part of switch 41. Switch 41 is open in the running position of the master switch A, but is closed when the master switch A is in the stopping position, as will be described presently. The fixed contact 59 of the switch 58 is connected by means of a lead 60 to the coil 29' of the relay 29 and to a wire 61. The wire 61 forms an extension of the lead 52 and extends to a fixed contact 62, which contact is disposed for cooperation with a movable contact 63. A wire 65 connects the movable contact 63 with a fixed contact point 67 of the stop switch 40. Likewise connected to the fixed contact 67 by the lead 66 is a movable contact 64 adapted to cooperate with a fixed contact 65, the latter being connected by a wire 68 to the reverse relay coil 30'. Each of the two contact pairs 62, 63 and 64, 65 constitutes a switch which is so constructed as to tend to maintain itself in open position.

A switch-closing member 70 is movably mounted on a stationary part of the machine, in the example shown pivotally mounted at 71 on the stationary shell 10. The switch-closing member 70 closes the contact pair or switch 62, 63 when in its one end position and the contact pair or switch 64, 65 when in its other end position. In any intermediate position of the switch member 70 both contact pairs 62, 63 and 64, 65 are open. The movable contacts 63 and 64 (or elements mechanically connected with them) are arranged in the path of the outer end of the switch-closing member 70, and serve, together with their corresponding fixed contacts 62 and 65, as abutments for this switch-closing member. A spring 72 normally holds the outer end of the switch-closing member 70 in engagement with the movable contact 63, keeping thereby the contact pair 62, 63 closed, as shown in Fig. 1.

At its inner end the switch-closing member 70 is provided with a roller 73. The switch-closing member 70 is constructed in such a manner that it is able to yield to a certain extent when actuated in the backward direction, as will be described more fully later. As an example for such a construction, a switch-closing member is shown in the drawing (see particularly Fig. 2), being composed of two parts 70' and 70" pivotally joined at 75. The inner part 70" which carries the roller 73 has an extension 76 and the outer part 70' has an extension 77, these two abutting extensions being normally kept in contact by a spring 78.

The switch-closing member 70 is operable by an actuating element 74 which participates in the reversible rotation of the cylinder 13. As an example for such an actuating element I have shown in the drawing a segment-shaped cam 74 which is attached to the end of the cylinder shaft 16 and comprises as active parts a nose 74' at its forward end and a face 74" of a predetermined length.

It has been described before that with the master switch A in the running position the contact segment 34 supplies periodically the two reversing relays 29 and 30 with current, causing thereby alternate operation of the 3-pole switches 27 and 28 which control the phases of the power supply to the motor 17. Thus the direction of the rotation of the motor 17 is reversed at regular intervals. Because the switch 39, 55 maintains a connection between lead 56 and the supply terminal 37 over the line 49, the solenoid 21 is energized and the brake 20 is kept released. During every revolution in the forward direction of the cylinder 13 the nose 74' of the actuating element 74 will move the switch lever 70 from the position shown in Fig. 1 into the position shown in dotted lines in Fig. 2, causing thereby the contact pair 62, 63 to open and the contact pair 64, 65 to close. When rotating in the reverse direction, the face 74" of the actuating element 74 will ride over the roller 73 of the switch-closing member 70 without opening the contact pair 62, 63, which is normally kept closed by the switch-closing member 70 under the action of the spring 72. The opening or closing of the contact pairs 62, 63 and 64, 65 during the normal operation of the machine (running position of the switch A) is, however, of no consequence to the control of the machine, since the fixed contact 67 to which the movable contacts 63 and 64 are connected, is open when the switch 40 is in non-stopping position.

To stop the machine, the master switch A is pulled up by means of the handle 42. This brings the movable switch elements 39, 40, 41 into the positions shown in dotted lines. The switch element 39 is now inactive. The switch 40 engages the fixed contact point 67, establishing thereby a connection between the supply terminal 37 and the movable contacts 63, 64 of the switches 62, 63 and 64, 65 over the leads 49 and 66. The movable element 41 engages the fixed contact point 79, connecting thereby the brake-release solenoid 21 with the switch 58 by means of the wires 56 and 69.

Supposing the master switch A is pulled up and accordingly the stop switch 40 is moved to motor-stopping position, when the cylinder 13 is revolving in the forward direction and cam 74 is not in contact with roller 73, the cylinder will continue its forward rotation until the nose 74' of the cam 74 engages the roller 73 of the switch-closing member 70. During this time the coil 29' of the forward relay 29 is kept energized over a circuit extending from the supply terminal 37 over the lead 49, the stop switch 40, contact 67, lead 66, the switch 63, 62, the lead 61, the coil 29', and the leads 54 and 48 to the other supply terminal 38. The energized coil 29' keeps the switch 27 as well as the switch 58, 59 closed, so that the motor 17 is connected to the power supply 24, 25, 26 in the forward phase, and, further, a circuit is established which keeps the brake 20 released. This latter circuit extends from the supply terminal 37 over the lead 49, the stop switch 40, 67, the lead 66, the switch 63, 62, the leads 61 and 60, the switch 59, 58, the lead 69, the switch 79, 41, the lead 56, the solenoid 21, and the leads 57 and 48 to the other supply terminal 38. When the nose 74' of the cam 74 engages the roller 73 of the switch-closing member 70, pushing this member about its pivot 71, the switch 62, 63 opens, interrupting thereby both circuits just described with the consequence that the motor 17 is cut off from its power supply and the solenoid 21 is deenergized, thus allowing the brake 20 to apply braking action to the motor 17. The momentum of the cylinder 13 and its load, however, carries the cylinder some distance further, and, depending upon the magnitude of the momentum developed by the more or less heavily laden cylinder, one of the two following cases will happen:

(a) The inertia of the cylinder is only large enough to move the cylinder through an angle which is smaller than the angular range. This range is determined by the location of the two switches 62, 63 and 64, 65, which act as limiting stops between which the switch-closing member 70 may swing. In this case the cylinder comes to a stop immediately with its door within the permissible stopping range and in register with the door 12 of the outer shell 10. The switch-closing member 70 is held in an intermediate position between the two switches 62, 63 and 64, 65, both being open.

(b) If the inertia of the cylinder is large enough to overcome the resistance of the brake 20 to such an extent that the cam 74 pushes the switch-closing member 70 into the other end position (shown in Fig. 2 in dotted lines) in which it closes the contact pair 64, 65, a circuit for the reverse relay 30 is established, but no circuit is completed for the brake-release solenoid 21. The circuit for the reverse relay 30 extends from the terminal 37 over the lead 49, the stop switch 40, 67, the lead 66, the switch 64, 65, the lead 68, the coil 30', and over the leads 54 and 48 to the terminal 38. Therefore, as the cylinder 13 passes beyond the limits of the angular range, the motor 17 is thrown in reverse while the brake 20 is still applied. The reversed motor, whose starting torque is sufficient to overcome the resistance of the brake, brings the cylinder (together with the cam 74) back within the range and possibly again beyond that range. Simultaneously therewith the switch-closing member 70 is returned by the spring 72 to the position shown in Fig. 1 in which it closes the switch 62, 63 which controls the forward relay 29 and the brake-releasing solenoid 21. Thus the cylinder swings back and forth through the range and a short distance beyond that range. Whenever the cam 74 swings on beyond the range and in the forward direction, the front portion of the face 74" of the cam 74 is riding upon the roller 73, keeping the switch 64, 65 closed. During the swinging back of the cam 74, the switch 64, 65 is still kept closed until the cam has cleared the roller 73. Then the switch-closing lever 70 moves to the position in which it closes the switch 62, 63, again starting the cylinder forward. This swinging back and forth of the cylinder 13 around its registering position continues until the inertia of the cylinder is exhausted, whereupon the latter comes to a stop within the permitted angular range. In practice not more than one or two oscillations of the cylinder are performed before it is stopped.

Supposing now the stop switch 40 is actuated at a time when the cylinder 13 is revolving in the backward direction (arrow R in Fig. 2) and the cam is riding on the roller 73. The inner part 70'' of the switch-closing member 70 is pressed backwardly with respect to the outer part 70' of this member 70 as shown in full lines in Fig. 2, and extensions 76 and 77 are no longer in contact. In this manner the connection reversing the motor to the forward rotation is kept engaged for a definite proportion of a revolution of the cylinder beyond the door registering position of the cylinder 13. Therefore, as the stop switch 40 is pulled when the cylinder is in this position, the above described circuit for the forward relay 29 containing said stop switch 40 is completed, while the reverse coil 30' is cut out. The motor 17, thereby receiving its power supply in the forward phase, reverses and starts to rotate in the forward direction. After the cam 74 has passed the roller 73 it will continue around the cylinder axis in a forward direction until the nose 74' strikes the lever 70, as before described. The operation from now on is identical to that which has been described before under the assumption that the stop switch 40 was actuated at a moment when the cylinder was revolving in the forward direction and the cam not in contact with the roller.

It will be seen, therefore, that no matter when the stop switch is actuated, and regardless of the direction in which the cylinder was moving at the moment the stop switch 40 was actuated, the cylinder will always enter the stopping range in a forward direction.

The interrelation of the cam 74 and the door 15 of the cylinder 13 is such that if at the moment of actuating the stop switch 40 the door 15 of the cylinder 13 should be exactly opposite the door 12 of the shell 10 but moving rearward, the cylinder would continue to move rearward for a little less than a half revolution before it reverses. The machine will always come to a stop after the door has come up from the bottom approximately a half turn, assuring that the clothes lie toward the front of the cylinder 13.

A special condition is met if the stop switch 40 is thrown at an instant when the cam nose 74 is riding on the roller 73 of the switch-closing lever 70 during backward rotation of the cylinder 13 and about to leave the roller. Again, the motor 17 will be switched over for forward rotation and the brake 20 will be held released. With the cylinders as normally used in commercial washing machines, the inertia of such a cylinder even when empty is sufficient to carry the cylinder 13 against the switched over motor 17 far enough in the backward direction so that the cam 74 will clear the roller 73 of the lever 70 before the cylinder 12 actually reverses into the forward direction. If, however, the cylinder has only low inertia and the motor is able to overcome this inertia before the cam 74 passes the roller 73 on the switch-closing member 70, the cylinder will have to perform almost a full revolution before the nose of the cam 74, running forward, will engage the switch-closing lever 70.

So it will be clear that even if the cylinder be in the most unfavorable position when the stop switch 40 is moved to motor-stopping position, it will still come into the desired area in a forward direction, even though the angle traversed in a forward direction can under some combinations of circumstances be somewhat less than normal.

All the electric controls described above for controlling the application of power in both directions and the release of the brake may be mounted on or close to the shell 10 of the washing machine in one common box with only a single lever, the switch-closing member 70, thrown back and forth by the cam 74 on the cylinder shaft 16. This arrangement makes the whole device particularly simple and desirable, since there are considerable moisture and detergents about a washer which make exposed contacts undesirable.

Should it be desired to have the cylinder come to a stop immediately following its turning movement in that direction which brings the load to the rear of the machine instead of to the front as has just been described, it would only be necessary to place the cam 74 and the switch actuated by the cam in the reverse position to that shown in Fig. 2.

While I have shown and described a certain embodiment of the invention, it is to be understood that this embodiment has been given by way of example only, and that various changes, rearrangements and modifications may be made without departing from the spirit of the invention or from the scope of the appended claims.

What I claim is:

1. In combination, a reversible motor, a power supply and a brake for said motor, a cylinder having substantial but indefinite inertia rotatable by said motor, and a device for stopping said cylinder within a limited predetermined angular range, said device comprising means for cutting off the power supply to said motor as the cylinder turns into said angular range, means for applying said brake while the cylinder traverses said angular range impelled by inertia, and means adapted to drive said motor in reverse as said cylinder passes beyond the limits of said angular range until it reenters this range.

2. In combination, a reversible motor, a power supply and a brake for said motor, a cylinder having substantial but indefinite inertia rotatable by said motor, and a device for stopping said cylinder within a limited predetermined angular range, said device comprising means for cutting off the power supply to said motor as the cylinder turns into said angular range, means adapted to drive said motor in reverse as said cylinder passes beyond the limits of said angular range until it reenters this range, and means for applying said brake while the cylinder traverses said angular range impelled by inertia as well as while the cylinder is moving beyond the angular range with the motor reversed.

3. In a washing machine, a stationary shell, a motor-driven reversible cylinder mounted in said shell, said cylinder having a door, and a device for stopping said cylinder with its door lying within a permissible angular range, said device comprising means to initiate stopping, a plurality of switching means for controlling the application of power to said motor in two directions, a single element for operating said switching means, and means carried by said cylinder controlling said element in such a manner that if upon initiation of the stopping, the machine be turning in the direction that the cylinder door is passing downward past the permissible angular range, said element will reverse the direction of rotation only when or after the downwardly moving door has passed over a substantial part of a full revolution.

4. A stationary shell, a cylinder rotatable in said shell, a door in said cylinder, an electromotor for rotating said cylinder, reversing means for said motor, and a device for stopping said cylinder within a permissible angular range, said device comprising means to initiate stopping, a control element biased in one direction to cause rotation of said cylinder in the forward direction when stopping is initiated, a cam forming a part of a circle so placed on the cylinder axis in relation to the cylinder door that its forward end will engage said element when said cylinder door enters said permissible stopping range coming up from below, the forward edge of said cam being adapted to push said element to a position to initiate reversing when the end of the permissible stopping range is reached, and the face of said cam being of such length as to hold the reversing connection engaged for a definite proportion of a revolution of said cylinder beyond the door registering position.

5. In combination, a rotatable element, a motor for driving said element, a brake for said element and said motor, said brake being biased to braking position, mechanism including relay means for controlling the connections of said motor to cause periodic reversals in the direction of rotation of said motor, a solenoid for holding said brake in releasing position, switch means for controlling said solenoid, and other manually operable switch means responsive to the angular position of said rotatable element for controlling said relay means, said relay means including a switch for closing an energizing circuit for said solenoid, said motor having a starting torque sufficient to overcome the braking action of said brake.

6. In combination, a reversible motor, a power supply and a brake for said motor, a cylinder having substantial but indefinite inertia rotatable by said motor and a device for stopping said cylinder within a limited angular range, said device comprising means for cutting off the power supply to said motor as the cylinder turns into said angular range, means adapted to drive said motor in reverse as said cylinder passes beyond the limits of said angular range until it reenters this range, and means for applying said brake while the cylinder traverses said angular range impelled by inertia as well as while the cylinder is moving beyond the angular range with the motor reversed, said motor having a starting torque sufficient to overcome the braking action of said brake.

7. In a machine of the class described, a stationary shell, a cylinder rotatable in said shell, a door in said cylinder, a power supply line, an electro-motor for rotating said cylinder in said shell, reversing means for said motor comprising two electro-magnetic relays each having a coil and an armature and each being adapted to cause rotation of said motor in one of two opposite directions, a device for stopping said cylinder with its door within predetermined limits, said device comprising a stop switch, two pairs of contacts, each pair having a connection to one of said relay coils and both pairs being connectable to the power supply line through said stop switch, a contact-closing member pivotally mounted on a stationary support and movable between said two contact pairs when in one or the other of its end positions, actuating means movable in conjunction with said cylinder for moving said member between said end positions, said end positions being arranged at a distance corresponding to a relatively small fraction of a full revolution of said cylinder, means for holding one of said contact pairs closed by said member while said member is not actuated by said actuating means, a normally applied brake for said motor, electric releasing means for said brake, and a circuit including said stop switch, said brake releasing means, the contact pair normally kept closed by said contact-closing member, and two further switches, the one forming part of the armature of the reversing relay connected to the last mentioned contact pair and the other being mechanically interlocked with said stop switch for opening or closing said circuit in unison with said stop switch, said electro-motor having a starting torque sufficient to overcome the braking action of said brake.

8. A stationary shell, a cylinder rotatable in said shell, a door in said cylinder, an electric motor driving said cylinder, a circuit causing said motor to rotate in one direction, a second circuit causing said motor to rotate in the reverse direction, electromagnetic relays in each circuit, a switch for initiating stopping of the cylinder within a predetermined angular range, a normally open circuited pair of contacts in each of the circuits controlling said electromagnetic relays, a member for closing said contacts mounted on a stationary pivot between said contact pairs, lever actuating means movable in conjunction with the rotation of said cylinder for swinging said member between its two end positions in either of which it closes one or the other of said contacts, said contact pairs being disposed at a distance from each other which corresponds to a relatively small fraction of a full revolution of said cylinder.

9. A stationary shell, a cylinder rotatable in said shell, a door in said cylinder, an electric motor driving said cylinder, a circuit causing said motor to rotate in one direction, a second circuit causing said motor to rotate in the reverse direction, electromagnetic relays in each circuit, a switch for initiating stopping of the cylinder within a predetermined angular range, a normally open circuited pair of contacts in each of the circuits controlling said electromagnetic relays, a member for closing said contacts mounted on a stationary pivot between said contact pairs, lever actuating means movable in conjunction with the rotation of said cylinder for swinging said member between its two end positions in either of which it closes one or the other of said contacts, said contact pairs being disposed at a distance from each other which corresponds to a relatively small fraction of a full revolution of said cylinder, and means for holding one of said contact pairs closed by said member when said member is not actuated by said actuating means.

10. A stationary shell, a cylinder rotatable in said shell, a door in said cylinder, an electric motor driving said cylinder, a circuit causing said motor to rotate in one direction, a second circuit causing said motor to rotate in the reverse direction, electromagnetic relays in each circuit, a switch for initiating stopping of the cylinder within a predetermined angular range, a normally open circuited pair of contacts in each of the circuits controlling said electromagnetic relays, a member for closing said contacts mounted on a stationary pivot between said contact pairs, lever actuating means movable in conjunction with the rotation of said cylinder for swinging said member between its two end positions in either of which it closes one or the other of said contacts, said contact pairs being disposed at a distance from each other which corresponds to a relatively small fraction of a full revolution of said cylinder, and means for holding one of said contact pairs closed by said member when said member is not actuated by said actuating means, a normally applied brake for said motor, electric means for releasing said brake, a circuit including said switch for initiating stopping of the member, said brake releasing means and said contact pair being normally kept closed by said member and a further switch forming part of the reversing relay connected to the last mentioned contact pair.

11. In combination, a rotatable member, a motor for rotating said member, two electromagnetic relays for driving, respectively, said motor in a forward direction and in reverse, a brake normally applied to said motor, electric means for releasing said brake, a control circuit for said electromagnetic relays, a manually operated stop switch in said control circuit, a normally closed brake releasing circuit controlled by said stop switch, a second brake releasing circuit including a second switch operable by one of said reversing relays and a third switch mechanically interlocked with said manually operated switch so that the second circuit can be established only if a particular electromagnetic relay is in action.

12. In combination, a rotatable element, a motor for driving said element, a brake for said element and said motor, said brake being biased to braking position, a pair of relay-actuated switches adapted to be alternately energized to cause rotation of said motor first in one direction then in the reverse direction, a solenoid adapted to hold said brake in released position, manually operable switch means in a circuit which includes said brake solenoid, a pair of switch elements, each controlling one of said relay switches after the manual switch is opened, means responsive to the angular position of said rotatable element for closing one or the other of said switch elements, a switch in a second circuit for energizing the brake releasing solenoid closed by one of said relay switches, the motor having a starting torque able to overcome the brake torque even though the second circuit is open.

13. In combination, a rotatable element, a motor for driving said element, a brake for said element and said motor, said brake being biased to braking position, a pair of relay-actuated switches adapted to be alternately energized to cause rotation of said motor first in one direction then in the reverse direction, a solenoid adapted to hold said brake in released position, manually operable switch means in a circuit which includes said brake solenoid, a pair of switch elements some distance apart, each switch element controlling one of said relay switches after the manual switch is opened, means responsive to the angular position of said rotatable element for closing one or the other of said switch elements when the rotatable element has carried said last means from one switch element to the other, a switch in a second circuit for energizing the brake releasing solenoid closed by one of said relay switches, the motor having a starting torque able to overcome the brake torque even though the second circuit is open.

14. In combination, a rotatable element, a motor for driving said element, a brake for said element and said motor having a smaller torque than that of the motor in starting, said brake being biased to braking position, mechanism including motive means and a pair of relay switches for causing said motor to rotate first in one direction then in the other direction, a solenoid for holding said brake in released position, a master switch for controlling said motor means and said solenoid, switch means responsive to the angular position of said rotatable element for controlling the energization of said relay switches, and means responsive to a certain one of said relay switches for connecting said solenoid in circuit when said master switch is in position to open circuit said motor.

15. In a washing machine, a stationary shell, a motor driven cylinder mounted in said shell for rotation in two directions, a door in said cylinder, a device designed to bring said cylinder to rest with the door lying within a predetermined range only when the cylinder door is moving in one direction, means to put said device into operation, a unitary assembly of the electric control means adapted to turn said motor in either of two directions, a single pivoted element and said unitary assembly for operating one or the other of said control elements, a cam forming a segment of a circle carried by said cylinder engaging said pivoted element in such a manner that, if the door on the cylinder is moving in the wrong direction through the angular range when the device is put into operation, the door must proceed in the wrong direction through a substantial part of the full revolution before the cam allows the cylinder to be reversed and the door is brought back to the predetermined angular range.

16. In combination with a rotatable member, a motor for rotating said member, two electromagnetic relays for driving said motor in two directions, a brake having a smaller torque than that which the motor exerts in starting, electric means for releasing the brake, means for automatically actuating one or the other of the two relays at fixed intervals, a multiple manual switch which transfers control of rotation to another device for stopping the member in a particular angular position, one element of the switch interrupting the normal circuit to the solenoid, another element of the switch closing a second circuit to the solenoid which includes a single switch which is operated by only one of said reversing relays so that the motor will operate against the brake when turning in one direction and with the brake released when turning in the other direction.

17. In combination, an electric motor, a power supply for the motor, a first switch supplying said motor with current to rotate in one direction, a second switch supplying said motor with current to rotate in the opposite direction, an element rotated by said motor, means engaged by said element when entering a predetermined angular range for cutting off both switches and closing one or the other of said switches when the element has passed through the predetermined angular range to change the direction of rotation of the element to move it back into the angular range whenever it leaves that range.

18. A stationary shell, a cylinder having an opening in its side mounted in said shell, a motor capable of rotating said cylinder in two directions, a plurality of switching means for supplying power to the motor to rotate the cylinder in either of two directions, a stop initiating button enabling said switching means to control the motor, a device engaged by the rotating cylinder when the opening enters a predetermined angular range to cut off power from the motor and to actuate one or the other of said switching means when the opening is carried by inertia of the cylinder beyond said angular range in either direction to turn the cylinder back into the angular range.

19. In combination with a rotatable member, a motor for rotating said member, two electromagnetic relays respectively supplying current to drive the motor forward or backward, a normally applied brake tending to stop the rotation of said motor, electrical means for releasing said brake, a switch for initiating the stopping of the rotation of said member, a device engaged by said rotatable member when entering a predetermined angular range which cuts the motor current, cuts the current to the electrical means for releasing the brake, and actuates one or the other of said electro-magnetic relays when the rotatable member leaves the predetermined angular range in either direction to turn it back into said range.

20. In a machine of the class described, a stationary shell, a cylinder rotatable in said shell, a door in said cylinder, a power supply line, an electro-motor for rotating said cylinder in said shell, reversing means for said motor comprising two electro-magnetic relays each having a coil and an armature and each being adapted to cause rotation of said motor in one of two opposite directions, a device for stopping said cylinder with its door located within a predetermined angular range said device comprising a switch for initiating stopping, two pairs of contacts, each pair having a connection to one of the said electro-magnetic relay coils and both pairs being connectable to the power supply line through said switch for initiating stopping, a contact-closing member pivotally mounted on a stationary support and movable between said two contact pairs so as to close one or the other of these contact pairs when in one or the other of its end positions, actuating means movable in conjunction with said cylinder for moving said contact closing member between said end positions, said end positions being arranged at a distance corresponding to a relatively small fraction of a full revolution of said cylinder, means for holding one of said contact pairs closed by said contact closing member while said member is not actuated by said actuating means, a normally applied brake for said motor, electric releasing means for said brake, and a circuit including said initiating switch, said brake releasing means, said contact pair kept closed by said contact-closing member, and a further switch forming part of the armature of the reversing relay connected to the last mentioned contact pair.

21. In a machine of the class described, a stationary shell, a cylinder rotatable in said shell, a door in said cylinder, a power supply line, an electric motor for rotating said cylinder in said shell, reversing means for said motor comprising two electro-magnetic relays each having a coil and an armature and each being adapted to cause rotation of said motor in one of two opposite directions, a device for stopping said cylinder with its door located in the predetermined angular range, said device comprising a switch for initiating stopping, two pairs of contacts, each pair having a connection to one of said relay coils and both pairs being connectable to the power supply line through said switch for initiating stopping, a contact-closing member pivotally mounted on a stationary support and movable between said two contact pairs when in one or the other of its end positions, actuating means movable in conjunction with said cylinder for moving said contact-closing member between said end positions, said end positions being arranged at a distance corresponding to a relatively small fraction of a full revolution of said cylinder, means for holding one of said contact pairs closed by said contact closing member while said member is not actuated by said actuating means, a normally applied brake for said motor, electric releasing means for said brake, and another circuit controlled by said initiating switch and including said brake releasing means, the contact pair normally kept closed by said contact closing member, and two further switches, the one switch forming part of the armature of the reversing relay connected to the last mentioned contact pair and the other switch being mechanically interlocked with said initiating switch for opening or closing said circuit in unison with said initiating switch.

22. In an angular positioning device for a cylinder, in combination, a reversible electric motor, a power supply, a normally applied brake for said motor which is insufficient to prevent the motor from starting, a solenoid to hold said brake in released position, a cylinder rotatable by said motor, controls for supplying current to maintain the rotation of the cylinder in one direction and to energize said solenoid, a device engaged by the cylinder when the cylinder enters a predetermined angular range which device operates said controls to cut the current supply to motor and to the solenoid, and again operates said controls when the cylinder leaves said angular range supplying current to reverse the motor without releasing the brake.

B. ALVIN BUSS.

REFERENCES CITED

The following references are of record in the file of this patent:

UNITED STATES PATENTS

| Number | Name | Date |
| --- | --- | --- |
| 1,709,059 | Carroll | Apr. 6, 1929 |
| 1,744,228 | Kaufmann | Jan. 21, 1930 |
| 1,952,371 | Glock | Mar. 27, 1934 |
| 2,285,517 | Harvey et al. | June 9, 1942 |